H. KLECKLER.
STRUT FITTING.
APPLICATION FILED NOV. 3, 1919.
1,349,677.
Patented Aug. 17, 1920.
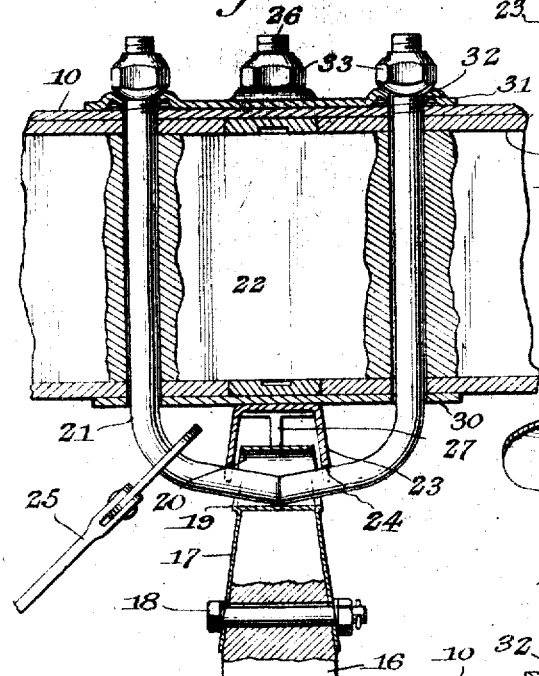
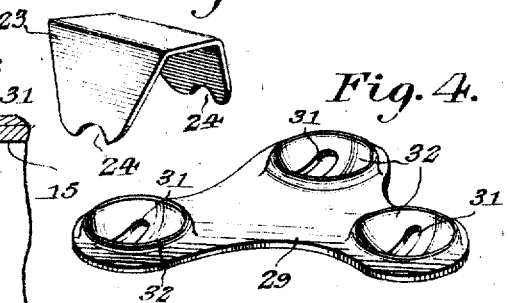
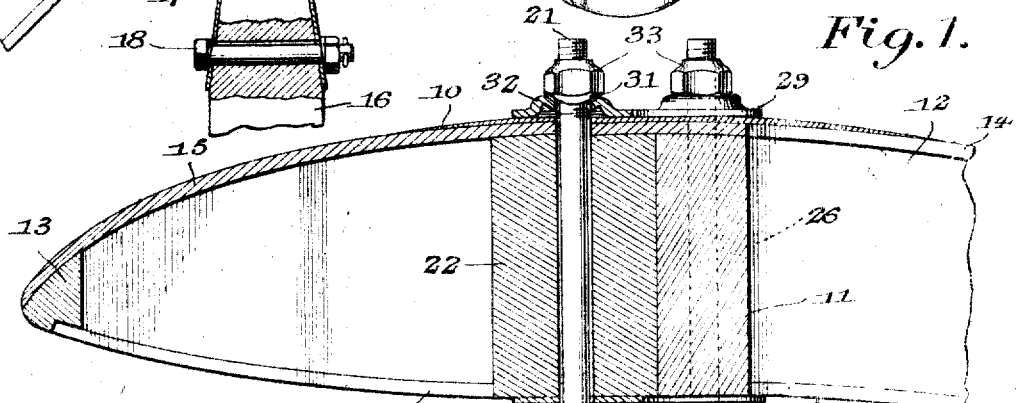
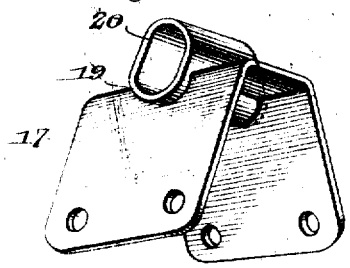
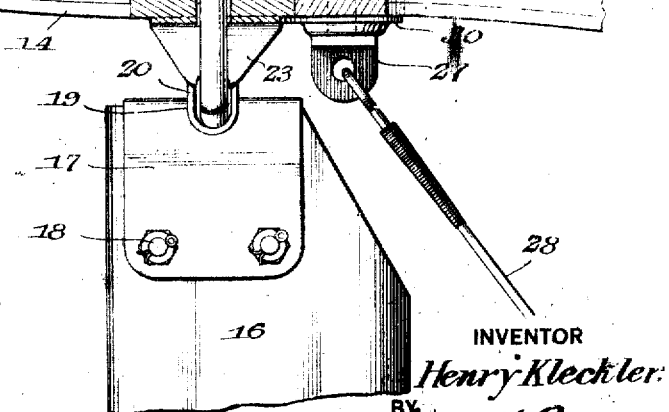
INVENTOR
Henry Kleckler.
BY
ATTORNEY

UNITED STATES PATENT OFFICE.

HENRY KLECKLER, OF GARDEN CITY, NEW YORK, ASSIGNOR, BY MESNE ASSIGNMENTS, TO CURTISS AEROPLANE AND MOTOR CORPORATION, OF BUFFALO, NEW YORK, A CORPORATION OF NEW YORK.

STRUT-FITTING.

1,349,677.

Specification of Letters Patent.  Patented Aug. 17, 1920.

Application filed November 3, 1919. Serial No. 335,280.

*To all whom it may concern:*

Be it known that I, HENRY KLECKLER, a citizen of the United States of America, residing at Garden City, in the county of Nassau and State of New York, have invented certain new and useful Improvements in Strut-Fittings, of which the following is a specification.

My invention relates to airplane strut fittings and more particularly to "wing post sockets" *i. e.* fittings used for fastening wing posts to wings.

An object of the invention is to simplify and at the same time minimize production cost of strut fittings. Instead of the more or less complex and costly fittings heretofore used a cheap and extremely simple fitting is employed. The fitting in its preferred embodiment comprises among other elements, an element fastened to and for a portion of its length spaced away from the wing. Such portion of the element bears directly against one end of the wing post or strut. Between the wing and the spaced portion of the element (preferably a U-bolt) a compression member is interposed. Accordingly said element is reinforced at its point of contact with the wing strut. In addition to the U-bolt and the compression member a socket member is provided. The end of the wing strut is fitted in this socket and the socket is in turn provided with means for fastening the U-bolt and strut together. In this way bearing contact between the U-bolt and strut is maintained. Preferably each of the mentioned fitting parts, excepting the U-bolt, is constructed of metal and formed by bending flat stock along pre-designated lines.

Of the drawing, wherein like characters of reference designate like or corresponding parts:

Figure 1 is a sectional view of a portion of an airplane wing showing its relation to the improved strut fitting.

Fig. 2 is a similar view, the section being taken at right angles to Fig. 1, and Figs. 3, 4, 5 and 6 are perspective views depicting different fitting parts.

For the embodiment of the invention selected for illustration, an airplane wing of somewhat conventional design is shown. The wing designated in its entirety as 10, comprises the usual front and rear wing beams or spars, 11 (only the front wing beam is shown) ribs 12 (but one of which is shown) nose strip 13, trailing edge strip (not shown) cap strips 14, and veneer nose covering 15, the latter as indicated, affording a rigid connection between the nose strip 13 and front wing beam 11 and at the same time affording a solid foundation at the entering or leading edge of the wing for the fabric covering (not shown) with which the wing is provided. Such ordinary wing parts, however, have nothing whatever to do with the invention since it is obvious as more particularly hereinafter pointed out that the invention *per se* may be used at any and all points wherein it is decided to connect a strut and beam.

The strut or wing post herein illustrated is designated as 16. It is provided with terminal socket members 17, each of which is formed of flat metal stock bent substantially U-shaped. The bight portion of each socket member is extended across one end of the strut and the sides or extensions thereof are bolted through the strut as indicated at 18. The socket members, transversely, are each notched as indicated at 19 to each receive an elliptical sleeve or ferrule 20. Preferably the sleeves or ferrules 20 are brazed or welded in place.

The U-bolt, designated as 21, for fastening the strut to the wing, extends transversely of the line of flight or longitudinally of the wing. Instead of penetrating the wing beam 11 the extensions of the U-bolt penetrate blocking 22, affixed to the beam 11, at the strut points in the wing. In this way a weakening of the beams is eliminated. The bight portion of each U-bolt extends beyond and is spaced away from the wing as indicated in Fig. 2. Between such portion and the wing a substantially U-shaped compression member is interposed. The compression member, like the socket fittings 17, is formed of flat metal stock bent substantially U-shaped and so arranged relatively to the U-bolt that its bight portion bears directly against the wing. The ends of the compression member, instead of being carried beyond the bight portion of the U-bolt, are notched as at 24. Accordingly, the U-bolt is held rigidly in place and strongly reinforced at its point of connection with the strut. Said bight portion of the U-bolt, (see Fig. 2) extends through the ferrule 20 of the socket fitting, and since the strut 16 is normally under compression, obviously bearing contact between the strut and U-bolt is at all times maintained.

By spacing the bight portion of the U-bolt away from the wing, anchorages for lift and landing wires (but one of which is shown and designated as 25) are provided. These wires connect directly with the bight portion. In addition to the anchorages formed by the U-bolt, an eye-bolt 26 having an eye-head 27 affords an anchorage for the stagger wire 28. The eye-bolt 26 penetrates the beam 11 and together with the U-bolt provides a rigid fastening for bearing plates 29 and 30 disposed against opposite faces of the wing. These bearing plates (see Figs. 4 and 5) are each provided with bolt slots or openings 31 through which the bolts 21 and 26 extend. Said plates are further provided with countersunk portions 32 within which nuts 33 for fastening the bolts are seated. By forcing the nuts firmly against the counter sunk portions they (the nuts) are yieldingly locked and the use of the lock washers or cotter-pins avoided.

The compression member 23 in addition to its function as a compression member serves as a fastening means for holding the bearing plate 30 firmly against the blocking 32. The compression member is clamped between the bearing plate 32 and the bight portion of the U-bolt. Accordingly as the nuts 33 are forced home the bight portion of the U-bolt is drawn firmly in contact with the extensions of the compression member and the latter, i. e. the compression member, held tightly against the bearing plate.

A fitting of the character described comprises but few parts, each of which with the possible exception of the U-bolt, may be formed from flat metal stock. The socket member 17 is merely bent over the end of the strut and bolted in place. The sleeve 20 is merely rolled into shape and brazed to the bight portion of the socket fitting 17. The compression member 23 requires no fastening and like the other parts just mentioned is constructed of flat stock bent into form. Both bearing plates may be stamped out with the counter sunk portions formed therein. Moreover the bolts 21 and 26 are both of standard design. By interposing a compression member between the spaced portion of the U-bolt and the blocking 22, the former is strongly reinforced and the compression stresses set up in the strut carried by way of the compression member directly to the wing. Considered from any angle the fitting is extremely simple and notably characterized by its adaptation to quantity production at small cost.

While I have described my invention in detail in its present preferred embodiment, it will be obvious to those skilled in the art after understanding my invention, that various changes and modifications may be made therein without departing from the spirit or scope thereof. I aim in the appended claims to cover all such modifications and changes.

1. An airplane strut fitting comprising a U-bolt having its bight portion in bearing contact with one end of a strut and a compression member having a portion thereof in bearing contact with the bight portion of the U-bolt.

2. An airplane strut fitting comprising, in combination with a strut and a beam or other element to which the strut is fastened, a U-bolt having its bight portion spaced away from the beam and in bearing contact with the strut and a compression member interposed between the bight portion of the U-bolt and the beam to reinforce that portion of the U-bolt spaced away from the beam and in bearing contact with the strut.

3. An airplane strut fitting comprising in combination with a strut and a beam or other element to which the strut is fastened, an element fastened to and for a portion of its length, spaced away from the beam, that portion of said element spaced away from the beam being in bearing contact with the strut, and a compression member fastened to and extended away from the beam, the extended portion of the compression member being in bearing contact with that portion of the element in bearing contact with the strut.

4. An airplane strut fitting comprising in combination with a strut and a beam or other element to which the strut is fastened, an element fastened to and for a portion of its length, spaced away from the beam, that portion of said element spaced away from the beam being in bearing contact with the strut, a fastening provided on the strut end to loosely hold the element in bearing contact with the strut and a compression member fastened to and extended away from the beam, the extended portion of the compression member being in bearing contact with that portion of the element in bearing contact with the strut.

5. An airplane strut fitting comprising, in combination with a strut and a beam or other element to which the strut is fastened, an element fastened to and for a portion of its length, spaced away from the beam, that portion of said element spaced away from the beam being in bearing contact with the strut, a substantially U-shaped compression ; its bight portion in bearing contact with the beam and its ends in bearing contact with that portion of the element in bearing contact with the strut.

6. An airplane strut fitting comprising, in combination with a strut and a beam or other element to which the strut is fastened, an element fastened to and for a portion of its length, spaced away from the beam, that portion of said element spaced away from the beam, being in bearing contact with the strut, a substantially U-shaped compression member having its bight portion in bearing contact with the beam and its ends notched and in bearing contact with that portion of the element in bearing contact with the strut, the notches in the ends of the compression member constituting pockets within which the element is seated.

7. An airplane strut fitting comprising, in combination with a strut and a beam or other element to which the strut is fastened, an element fastened to and for a portion of its length, spaced away from the beam, that portion of said element spaced away from the beam being in bearing contact with the strut, a sleeve fastened on the strut end to receive and hold the element in bearing contact with the strut, and a compression member fastened to and extended away from the beam, the extended portion of the compression member being in bearing contact with that portion of the element in bearing contact with the strut.

In testimony whereof I hereunto affix my signature.

HENRY KLECKLER.